United States Patent
Wada et al.

(10) Patent No.: US 10,124,825 B2
(45) Date of Patent: Nov. 13, 2018

(54) STEERING APPARATUS AND STEERING ASSIST METHOD

(71) Applicant: HONDA MOTOR CO., LTD., Tokyo (JP)

(72) Inventors: Takuji Wada, Wako (JP); Hiroyuki Koibuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/013,098

(22) Filed: Feb. 2, 2016

(65) Prior Publication Data

US 2016/0229447 A1    Aug. 11, 2016

(30) Foreign Application Priority Data

Feb. 10, 2015    (JP) ................. 2015-024468

(51) Int. Cl.
  *B62D 5/04*    (2006.01)
  *B62D 6/00*    (2006.01)

(52) U.S. Cl.
  CPC ......... *B62D 5/0463* (2013.01); *B62D 6/007* (2013.01)

(58) Field of Classification Search
  USPC .......................................................... 701/41
  See application file for complete search history.

(56) References Cited

U.S. PATENT DOCUMENTS

| | | | |
|---|---|---|---|
| 8,346,476 B2 * | 1/2013 | Taguchi | B60W 30/143 701/424 |
| 9,327,761 B2 * | 5/2016 | Tsubaki | B62D 5/0472 |
| 9,327,765 B2 * | 5/2016 | Takeda | B62D 6/003 |
| 2001/0022245 A1 * | 9/2001 | Rogg | B60K 6/365 180/65.21 |
| 2002/0038171 A1 * | 3/2002 | Deguchi | B62D 7/159 701/41 |

(Continued)

FOREIGN PATENT DOCUMENTS

| | | |
|---|---|---|
| JP | 2001-130431 A | 5/2001 |
| JP | 2010-204795 A | 9/2010 |

OTHER PUBLICATIONS

English Translation of Japanese Patent Pub. No. 2001-130431 to Nishizaki et al. (https://www4.j-platpat.inpit.go.jp/cgi-bin/tran_web_cgi_ejje?u=http://www4.j-platpat.inpit.go.jp/eng/translation/201702160441164641786075632390260​21C3F90E5A2F76AD537C-B8E2EA126F343).*

(Continued)

*Primary Examiner* — Jean Paul Cass
(74) *Attorney, Agent, or Firm* — Westerman, Hattori, Daniels & Adrian, LLP (57) ABSTRACT

A steering apparatus and a steering assist method are capable of being preferably used for a first curve and a second carve which are different in cornering direction and which are sequentially provided. When a vehicle travels through the first curve and the second curve, a controller in the steering apparatus shifts a steering angle control value with respect to a steering angle detection value in response to returning of a steering wheel and decrease of steering assist torque to a torque threshold value while the vehicle is running in the first curve and starts generation of the steering assist torque for the second curve before the steering angle detection value returns to a sensor median due to returning of the steering wheel.

16 Claims, 5 Drawing Sheets

(56) References Cited

U.S. PATENT DOCUMENTS

| | | | | |
|---|---|---|---|---|
| 2008/0189013 A1* | 8/2008 | Iwazaki | ................ | B60T 8/172 701/41 |
| 2010/0066277 A1* | 3/2010 | Bailey | ................ | B60L 11/123 318/143 |
| 2010/0070120 A1* | 3/2010 | Bailey | ................ | B60K 6/46 701/22 |
| 2011/0178689 A1* | 7/2011 | Yasui | ................ | B60T 7/12 701/70 |
| 2012/0185113 A1* | 7/2012 | Pampus | ................ | B60W 30/06 701/1 |
| 2013/0124047 A1* | 5/2013 | Lazic | ................ | B62D 15/025 701/42 |
| 2014/0021898 A1* | 1/2014 | Hendrickson | ........ | H02P 29/028 318/434 |
| 2014/0222295 A1* | 8/2014 | Dornhege | ............ | B62D 6/002 701/42 |
| 2015/0025743 A1* | 1/2015 | Tamura | ................ | B62D 5/046 701/41 |
| 2015/0120134 A1* | 4/2015 | Kanou | ................ | B62D 15/0245 701/34.4 |
| 2015/0232122 A1* | 8/2015 | Sakurai | ................ | B62D 6/008 701/41 |
| 2016/0001810 A1* | 1/2016 | Tsubaki | ................ | B62D 5/0472 701/42 |
| 2016/0229447 A1* | 8/2016 | Wada | ................ | B62D 5/0463 |
| 2016/0272239 A1* | 9/2016 | Kim | ................ | B62D 15/021 |

OTHER PUBLICATIONS

English Translation of Japanese Patent Pub. No. JP 2010-204795 to Kishida et al. (https://www4.j-platpat.inpit.go.jp/cgi-bin/tran_web_cgi_ejje?u=http://www4.j-platpat.inpit.go.jp/eng/translation/20170216054704917178647047216392631C3F90E5A2F76AD537-CB8E2EA126F343).*

\* cited by examiner

FIG. 5

STEERING APPARATUS AND STEERING ASSIST METHOD

CROSS REFERENCES TO RELATED APPLICATIONS

The present application claims priority under 35 U.S.C. § 119 to Japanese Patent Application No. 2015-024468, filed Feb. 10, 2015, entitled "Steering apparatus and steering assist method." The contents of this application are incorporated herein by reference in their entirety.

TECHNICAL FIELD

The present disclosure relates to a steering apparatus and a steering assist method that assist steering with steering assist torque generated by a motor.

BACKGROUND

Japanese Unexamined Patent Application Publication No. 2010-204795 discloses a visual guidance apparatus to suppress a variation in steering operation when a vehicle exits a curve, that is, at the beginning of a corner (summary). Japanese Unexamined Patent Application Publication No. 2001-130431 discloses correction of offset errors of an operation angle sensor and a turning angle sensor (summary).

In Japanese Unexamined Patent Application Publication No. 2010-204795 and Japanese Unexamined Patent Application Publication No. 2001-130431, driving of a vehicle on a first curve and a second curve (so-called S-shaped curve or double apex curve) which are different in cornering direction and which are sequentially provided is not specially considered.

SUMMARY

It is desirable to provide a steering apparatus and a steering assist method capable of being preferably used for a first curve and a second carve which are different in cornering direction and which are sequentially provided.

One aspect of the present application describes a steering apparatus including a steering angle sensor that acquires a steering angle detection value of a steering wheel; a motor that generates steering assist torque assisting steering; and a control unit that controls an output from the motor using a steering angle control value calculated on the basis of the steering angle detection value. When a vehicle runs on a first curve and a second curve which are different in cornering direction and which are sequentially provided, the control unit shifts the steering angle control value with respect to the steering angle detection value in response to returning of the steering wheel while the vehicle is running on the first curve and decrease of the steering assist torque to a torque threshold value and starts the generation of the steering assist torque for the second curve before the steering angle detection value returns to a sensor median.

According to the one aspect of the present disclosure, the steering angle control value is shifted with respect to the steering angle detection value in response to returning of the steering wheel while the vehicle is running on the first curve and decrease of the steering assist torque to the torque threshold value, and the generation of the steering assist torque for the second curve is started before the steering angle detection value returns to the sensor median. With the above configuration, the steering assist torque for the second curve can be generated even before the steering angle detection value returns to the sensor median. Accordingly, it is possible to prevent a feeling of strangeness for the cornering assist torque from being provided to a driver at the start of the cornering on the second curve.

The control unit may shift the steering angle control value with respect to the steering angle detection value by offsetting or resetting the steering angle control value. With the above configuration, it is possible to shift the steering angle control value with respect to the steering angle detection value using the simple process.

The control unit may store the steering angle detection value when the steering wheel is returned while the vehicle is running on the first curve and the steering assist torque is decreased to the torque threshold value as an offset value, and may subtract the offset value from the steering angle detection value to use the result of the subtraction as the steering angle control value. With the above configuration, it is possible to set the steering angle control value to a control median using the simple method.

The control unit may calculate a reference yaw rate of the vehicle on the basis of a radius or a curvature radius of a curve on which the vehicle is currently running and a vehicle speed, may set a correction coefficient on the basis of the radius or the curvature radius of the curve on which the vehicle is currently running, and may set the steering assist torque in accordance with a target yaw rate, which is a product of the reference yaw rate and the correction coefficient. With the above configuration, while the vehicle is cornering, it is possible to set the steering assist torque with reflecting the effect of the radius or the curvature radius of the curve on which the vehicle is currently running to the reference yaw rate.

While the vehicle is running on the first curve, the control unit may decrease the steering assist torque for cornering on the first curve stepwise in accordance with a distance from a current position of the vehicle to an entrance of the second curve. With the above configuration, when the vehicle enters the second curve, it is possible to decrease the cornering assist torque for the cornering on the first curve to a first predetermined value. Consequently, when the vehicle starts the cornering on the second curve, it is possible to smoothly generate the cornering assist torque for the cornering on the second curve.

While the vehicle is running on the first curve, the control unit may decrease the steering assist torque for cornering on the first curve stepwise in accordance with a distance from a current position of the vehicle to an exit of the first curve. With the above configuration, when the vehicle exits the first curve, it is possible to decrease the cornering assist torque for the cornering on the first curve to a second predetermined value. Consequently, when the vehicle starts the cornering on the second curve, it is possible to smoothly generate the cornering assist torque for the cornering on the second curve.

The control unit may increase an amount of decrease of the steering angle control value with respect to an amount of decrease of the steering angle detection value when the steering wheel is returned while the vehicle is running on the second curve and may make the steering angle control value equal to the steering angle detection value before the vehicle reaches an exit of the second curve. With the above configuration, before the second curve ends, it is possible to make the reference position of the steering wheel equal to the control median. Accordingly, it is possible to avoid the feeling of strangeness of the driver caused by the difference between the reference position of the steering wheel and the control median (the vehicle that goes straight in a state in which the steering wheel is rotated (shifted) from the reference position).

The control unit may acquire map information about the first curve from a map information storage unit and may calculate the steering assist torque assisting cornering on the first curve on the basis of the map information about the first curve to use the calculated steering assist torque when the vehicle corners on the first curve. With the above configuration, it is possible to perform the driving support on the first curve with high precision and to generate the steering assist torque for the second curve with higher precision.

The control unit may acquire map information about the second curve from the map information storage unit, may calculate the steering assist torque assisting cornering on the second curve on the basis of the map information about the second curve, and may start the generation of the steering assist torque for the second curve before the steering angle detection value returns to the sensor median. With the above configuration, it is possible to perform the driving support on the second curve with high precision and to generate the steering assist torque for the second curve with higher precision.

Another aspect of the present application describes a steering assist method using a steering apparatus including a steering angle sensor that acquires a steering angle detection value of a steering wheel; a motor that generates steering assist torque assisting steering; and a control unit that controls an output from the motor using a steering angle control value calculated on the basis of the steering angle detection value. When a vehicle runs on a first curve and a second curve which are different in cornering direction and which are sequentially provided, the control unit shifts the steering angle control value with respect to the steering angle detection value in response to returning of the steering wheel while the vehicle is running on the first curve and decrease of the steering assist torque to a torque threshold value and starts the generation of the steering assist torque for the second curve before the steering angle detection value returns to a sensor median.

According to the another aspect of the present disclosure, it is possible to preferably perform the steering support for the first curve and the second curve which are different in cornering direction and which are sequentially provided. In addition, it is possible to prevent the feeling of strangeness for the cornering assist torque from being provided to the driver.

BRIEF DESCRIPTION OF THE DRAWINGS

The advantages of the disclosure will become apparent in the following description taken in conjunction with the following drawings.

DETAILED DESCRIPTION

A. One Embodiment
A1. Description of Entire Configuration
[A1-1. Entire Configuration]

Figure 1:
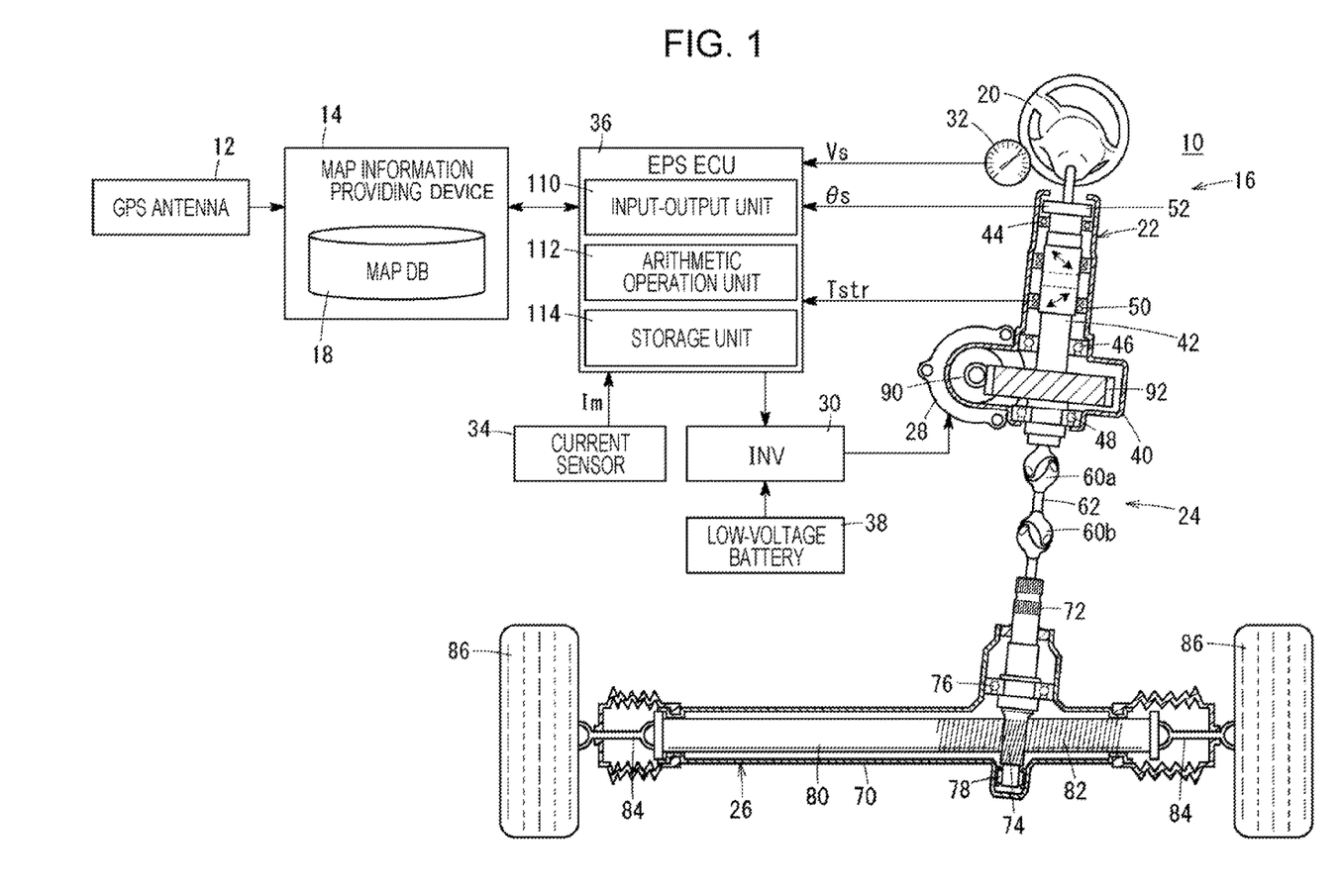
FIG. 1 schematically illustrates an exemplary configuration of a vehicle including an electric power steering apparatus serving as a steering apparatus according to an embodiment of the present disclosure.

FIG. 1 schematically illustrates an exemplary configuration of a vehicle 10 including an electric power steering apparatus 16 (hereinafter referred to as an "EPS apparatus 16") serving as a steering apparatus according to an embodiment of the present disclosure. Referring to FIG. 1, the vehicle 10 includes a Global Positioning System (GPS) antenna 12 and a map information providing device 14, in addition to the EPS apparatus 16.

[A1-2. GPS Antenna 12]

The GPS antenna 12 receives signals (GPS signals) from multiple GPS satellites above the vehicle 10 and supplies the received signals to the map information providing device 14.

[A1-3. Map Information Providing Device 14]

The map information providing device 14 identifies a current position Pc of the vehicle 10 on the basis of an output from the GPS antenna 12 and supplies information (hereinafter also referred to as "map information Imap") concerning the current position Pc and the periphery of the current position Pc to the EPS apparatus 16. The map information Imap includes a radius R of a curve (hereinafter also referred to as a "curve radius R"), a distance Lin to an entrance of a curve (hereinafter also referred to as a "distance-to-starting-point Lin"), and a distance Lout to an exit of a curve (hereinafter also referred to as a "distance-to-end-point Lout"). The radius R of a near-side curve 302 (hereinafter also referred to as a "first curve 302") in an S-shaped curve 300 (refer to FIG. 5) is hereinafter referred to as a "radius R1" and the distance-to-end-point Lout of the first curve 302 is hereinafter referred to as a "distance-to-end-point L1out". The radius R of a curve 304 (hereinafter also referred to as a "second curve 304") next to the first curve 302 is referred to as a "radius R2", the distance-to-starting-point Lin of the second curve 304 is referred to as a "distance-to-starting-point L2in", and the distance-to-end-point Lout of the second curve 304 is referred to as a "distance-to-end-point L2out".

The map information Imap is stored in a map database 18 (hereinafter referred to as a "DB 18") in the map information providing device 14. The map information providing device 14 identifies the current position Pc of the vehicle 10 on the basis of the GPS signals received by the GPS antenna 12. The map information providing device 14 reads out the map information Imap from the map DB 18 on the basis of the current position Pc and supplies the map information Imap to the EPS apparatus 16.

[A1-4. EPS Apparatus 16]
(A1-4-1. Entire Configuration of EPS Apparatus 16)

The EPS apparatus 16 includes a steering wheel 20 (hereinafter also referred to as a "steering 20"), a steering column 22, an intermediate joint 24, a steering gear box 26, a motor 28 for driving the EPS apparatus 16 (hereinafter also referred to as an "EPS motor 28"), an inverter 30 (hereinafter also referred to as an "EPS inverter 30"), a vehicle speed sensor 32, a current sensor 34, an electric power steering electronic control unit 36 (hereinafter referred to as an "EPS ECU 36" or an "ECU 36"), and a low-voltage battery 38 (hereinafter also referred to as a "battery 38").

The steering column 22 includes a housing 40, a steering shaft 42 supported by bearings 44, 46, and 48 in the housing 40, a torque sensor 50, and a steering angle sensor 52.

The intermediate joint 24 includes two universal joints 60a and 60b and a shank 62 disposed between the universal joints 60a and 60b.

The steering gear box 26 includes a housing 70, a pinion shaft 72 on which a pinion 74 of a rack and pinion mechanism is provided and which is supported by bearings 76 and 78, a rack shaft 80 on which rack teeth 82 of the rack and pinion mechanism are provided, and tie rods 84.

(A1-4-2. Manual Steering System)

One end of the steering shaft 42 is fixed to the steering wheel 20 and the other end of the steering shaft 42 is linked to the universal joint 60a. The universal joint 60a is used to link the other end of the steering shaft 42 to one end of the shank 62. The universal joint 60b is used to link the other end of the shank 62 to one end of the pinion shaft 72. The pinion 74 of the pinion shaft 72 is engaged with the rack teeth 82 of the rack shaft 80 capable of reciprocating in a vehicle width direction. Both ends of the rack shaft 80 are linked to left and right front wheels 86 (steering wheels) via the corresponding tie rods 84.

Accordingly, steering torque Tstr generated by a driver who operates the steering wheel 20 is transmitted to the pinion shaft 72 via the steering shaft 42 and the intermediate joint 24. The steering torque Tstr is converted into thrust by the pinion 74 of the pinion shaft 72 and the rack teeth 82 of the rack shaft 80, and the rack shaft 80 is displaced in the vehicle width direction. The front wheels 86 are turned by the tie rod 84 in association with the displacement of the rack shaft 80 to change the orientation of the vehicle 10.

The steering shaft 42, the intermediate joint 24, the pinion shaft 72, the rack shaft 80, and the tie rods 84 compose a manual steering system that directly transmits a steering operation by the driver for the steering wheel 20 to the front wheels 86.

(A1-4-3. Turning Assist System)
(A1-4-3-1. Assist Drive System)

The EPS motor 28 is linked to the steering shaft 42 via a worm gear 90 and a worm wheel gear 92. In other words, an output shaft of the EPS motor 28 is linked to the worm gear 90. The worm wheel gear 92 engaged with the worm gear 90 is integrally or resiliently formed on the steering shaft 42 itself.

Although the EPS motor 28 of the present embodiment is of, for example, a three-phase alternating current (AC) brushless type, the EPS motor 28 may be another motor of, for example, a three-phase AC brush type, a single-phase AC type, or a direct current (DC) type. Power is supplied from the low-voltage battery 38 to the EPS motor 28 via the EPS inverter 30 controlled by the EPS ECU 36. The EPS motor 28 generates driving torque Tm (hereinafter also referred to as "motor torque Tm" or "torque Tm") corresponding to the power. The motor torque Tm (or the thrust based on the motor torque Tm) is transmitted to the rack shaft 80 via the output shaft of the EPS motor 28, the worm gear 90, the steering shaft 42 (the worm wheel gear 92), the intermediate joint 24, and the pinion shaft 72. The EPS motor 28, the worm gear 90, and the steering shaft 42 (the worm wheel gear 92) compose an assist drive system that generates driving force for the steering (the motor torque Tm).

The torque Tm in the present embodiment is used as steering assist torque Tasi. The steering assist torque Tasi includes reference assist torque Tref and cornering assist torque Tcv. The reference assist torque Tref is driving force that operates in the same direction as that of input torque (the steering torque Tstr) into the steering wheel 20 by the driver to assist the steering by the driver. The cornering assist torque Tcv is torque assisting the vehicle 10 to easily corner. As described below, the steering assist torque Tasi may be operated in a direction opposite to that of the steering torque Tstr. The cornering assist torque Tcv is driving force that assists the steering torque Tstr to cause the vehicle 10 to corner.

(A1-4-3-2. Assist Control System)

The EPS inverter 30, the vehicle speed sensor 32, the current sensor 34, the EPS ECU 36, the torque sensor 50, and the steering angle sensor 52 compose an assist control system that controls the assist drive system. The assist drive system, the assist control system, and the low-voltage battery 38 are hereinafter also referred to as a turning assist system collectively. In the present embodiment, the output from the EPS motor 28 is controlled through so-called vector control using a d axis and a q axis.

(a) Feed Forward System Sensor Group

The torque sensor 50 detects the torque Tstr (also referred to the "steering torque Tstr") applied to the steering shaft 42 and supplies the detected torque Tstr to the EPS ECU 36. The vehicle speed sensor 32 detects a vehicle speed Vs [km/h] and supplies the vehicle speed Vs to the EPS ECU 36. The steering angle sensor 52 detects the steering angle (hereinafter referred to as a "steering angle detection value θs") [degree] indicating the amount of steering of the steering wheel 20 and supplies the steering angle detection value θs to the EPS ECU 36. The steering torque Tstr, the vehicle speed Vs, and the steering angle detection value θs are used for feed forward control in the EPS ECU 36.

(b) EPS Inverter 30

The EPS inverter 30 has a three-phase bridge configuration. The EPS inverter 30 converts direct current supplied from the low-voltage battery 38 into three-phase alternating current through DC-AC conversion and supplies the three-phase alternating current to the EPS motor 28.

(c) Feedback System Sensor Group

The current sensor 34 detects q-axis current (hereinafter referred to as "motor current Im"), which is a torque current component in the vector control. The motor current Im in the present embodiment has a positive value when the rotation direction of the EPS motor 28 is a first direction (for example, a direction in which the vehicle 10 turns right) and has a negative value when the rotation direction of the EPS motor 28 is a second direction (for example, a direction in which the vehicle 10 turns left). However, the vector control may be performed with the motor current Im being set only to a positive value as long as the first direction and the second direction are capable of being determined.

The current sensor 34 includes a current sensor (not illustrated) that detects current of at least two phases, among a U phase, a V phase, and a W phase in winding (not illustrated) of the EPS motor 28; a resolver (not illustrated) that detects an electrical angle θ, which is a rotation angle of the output shaft (not illustrated) of the EPS motor 28 or an external rotor; and a q-axis current calculator that calculates the q-axis current (the motor current Im) on the basis of the current of at least two phases and the electrical angle θ described above. The EPS ECU 36 may have the function of the q-axis current calculator.

(d) EPS ECU 36

As illustrated in FIG. 1, the EPS ECU 36 includes an input-output unit 110, an arithmetic operation unit 112, and a storage unit 114 as hardware components. The EPS ECU 36 controls the output from the EPS motor 28 via the EPS inverter 30 on the basis of the output value from each sensor.

The EPS ECU 36 will be described in detail below with reference to FIG. 2 to FIG. 4.

(A1-4-3-3. Low-Voltage Battery 38)

The low-voltage battery 38 is a charge device capable of outputting low voltage (12 volts in the present embodiment). For example, a secondary battery, such as a lead acid battery, may be used as the low-voltage battery 38.

A2. Steering Assist Control

[A2-1. Outline of Steering Assist Control]

Control in the EPS ECU 36 in the present embodiment will now be described.

(A2-1-1. Functional Configuration of Arithmetic Operation Unit 112)

Figure 2:
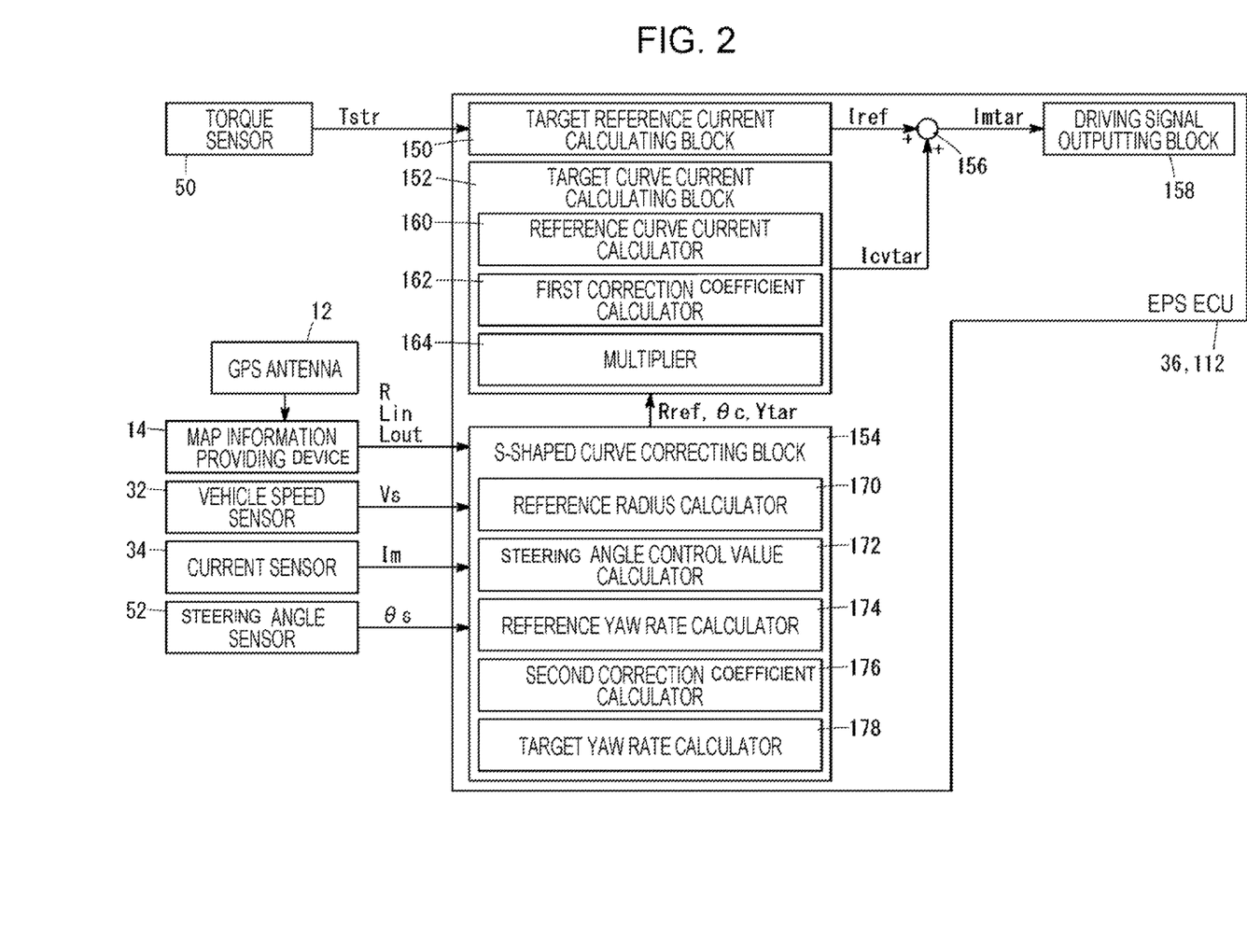
FIG. 2 is a block diagram illustrating an exemplary functional configuration of an arithmetic operation unit in an electric power steering electronic control unit (hereinafter referred to as an "EPS ECU") in the above embodiment.

FIG. 2 is a block diagram illustrating an exemplary functional configuration of the arithmetic operation unit 112 in the EPS ECU 36 in the present embodiment. Referring to FIG. 2, the arithmetic operation unit 112 includes a target reference current calculating block 150, a target curve current calculating block 152, an S-shaped curve correcting block 154, an adder 156, and a driving signal outputting block 158. The arithmetic operation unit 112 executes programs stored in the storage unit 114 to realize the target reference current calculating block 150, the target curve current calculating block 152, the S-shaped curve correcting block 154, the adder 156, and the driving signal outputting block 158. However, part of the functions of the target reference current calculating block 150, the target curve current calculating block 152, the S-shaped curve correcting block 154, the adder 156, and the driving signal outputting block 158 may be realized by hardware (for example, an electric circuit).

The target reference current calculating block 150 calculates motor current (hereinafter referred to as "target reference current Iref") corresponding to the reference assist torque Tref. Specifically, the target reference current calculating block 150 calculates the target reference current Iref in accordance with an output from the torque sensor 50.

The target curve current calculating block 152 calculates motor current (hereinafter referred to as "cornering assist target current") corresponding to the cornering assist torque Tcv. The S-shaped curve correcting block 154 reflects the effect specific to running on the S-shaped curve 300 in the cornering assist target current.

The S-shaped curve correcting block 154 in the present embodiment realizes the correction by reflecting the effect specific to the S-shaped curve 300 in various numerical values input into the target curve current calculating block 152. Instead of the above method, correction current may be calculated in the S-shaped curve correcting block 154 and the calculated correction current may be supplied to the adder 156.

(A2-1-2. Target Reference Current Calculating Block 150)

As described above, the target reference current calculating block 150 calculates the target reference current Iref, which is the motor current corresponding to the reference assist torque Tref. Specifically, the target reference current calculating block 150 calculates the target reference current Iref in accordance with an output (the steering torque Tstr) from the torque sensor 50.

The EPS ECU 36 calculates the target reference current. Iref on the basis of the steering torque Tstr and so on. The target reference current Iref is a reference value of the motor current Im to assist the steering by the driver. Basically, the absolute value of the target reference current Iref is increased with the increasing absolute value of the steering torque Tstr. For example, so-called inertia control or damper control may be used for the calculation of the target reference current Iref.

(A2-1-3. Target Curve Current Calculating Block 152)

The target curve current calculating block 152 calculates the cornering assist target current corresponding to the cornering assist torque Tcv. As illustrated in FIG. 2, the target curve current calculating block 152 includes a reference curve current calculator 160, a first correction coefficient calculator 162, and a multiplier 164.

The reference curve current calculator 160 calculates curve cornering assist current. The first correction coefficient calculator 162 calculates a first correction coefficient $\alpha$. The multiplier 164 multiplies the curve cornering assist current by the first correction coefficient $\alpha$ to calculate target curve current Icvtar. The calculation and setting of the target curve current Icvtar will be described below with reference to FIG. 3.

(A2-1-4. S-Shaped Curve Correcting Block 154)

The S-shaped curve correcting block 154 reflects the effect specific to running on the S-shaped curve 300 in the cornering assist target current. As illustrated in FIG. 2, the S-shaped curve correcting block 154 includes a reference radius calculator 170, a steering angle control value calculator 172, a reference yaw rate calculator 174, a second correction coefficient calculator 176, and a target yaw rate calculator 178.

The reference radius calculator 170 calculates a reference radius Rref. The steering angle control value calculator 172 calculates a steering angle control value $\theta c$. The reference yaw rate calculator 174 calculates a reference yaw rate Yref. The second correction coefficient calculator 176 calculates a second correction coefficient $\beta$. The target yaw rate calculator 178 multiplies the reference yaw rate Yref by the second correction coefficient $\beta$ to calculate a target yaw rate Ytar. The components in the S-shaped curve correcting block 154 will be described in detail below.

(A2-1-5. Adder 156)

The adder 156 adds the target reference current Iref from the target reference current calculating block 150 to the target curve current Icvtar from the target curve current calculating block 152 to calculate target motor current Imtar.

(A2-1-6. Driving Signal Outputting Block 158)

The driving signal outputting block 158 controls the inverter 30 on the basis of the target motor current Imtar from the adder 156 and the motor current Im from the current sensor 34.

[A2-2. Calculation of Target Curve Current Icvtar]

Figure 3:
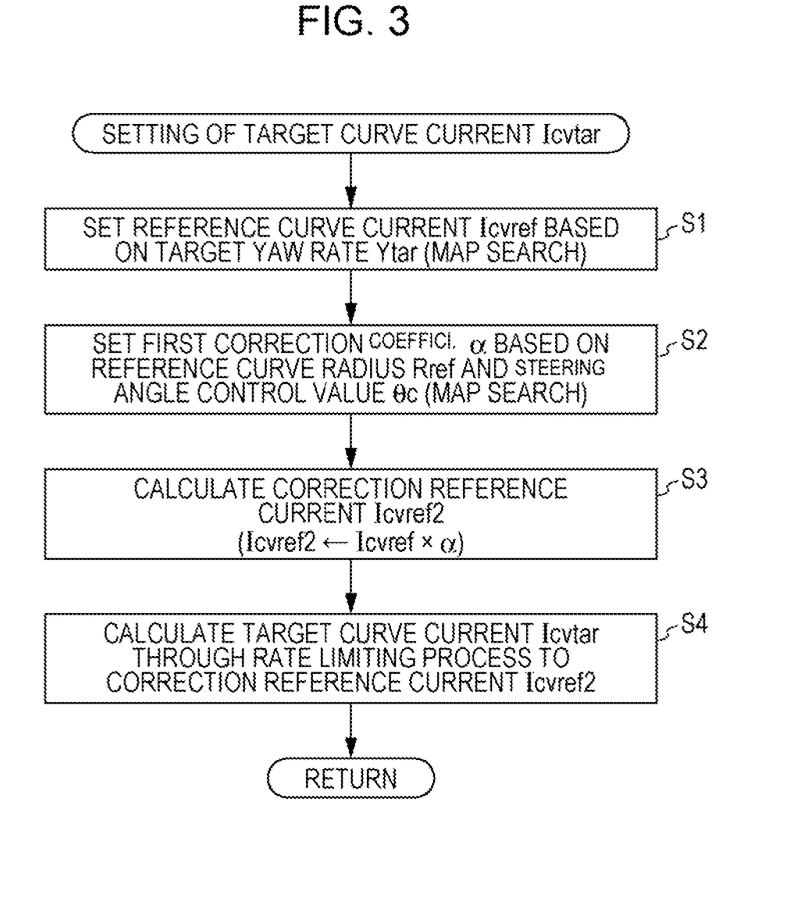
FIG. 3 is a flowchart illustrating an exemplary process of calculating target curve current by the EPS ECU in the above embodiment.

FIG. 3 is a flowchart illustrating an exemplary process of calculating the target curve current Icvtar by the EPS ECU 36 in the present embodiment. The calculation of the target curve current Icvtar is performed by the target curve current calculating block 152. The EPS ECU 36 repeats the process in FIG. 3 on a certain first calculation cycle (for example, a cycle of several microseconds to several hundred milliseconds).

Referring to FIG. 3, in Step S1, the EPS ECU 36 (the reference curve current calculator 160) sets reference curve current Icvref on the basis of the target yaw rate Ytar. The target yaw rate Ytar is supplied from the S-shaped curve correcting block 154 to the target curve current calculating block 152. The target yaw rate Ytar has been corrected in consideration of the S-shaped curve 300 (will be described in detail below with reference to FIG. 4). For example, the reference curve current Icvref is set so as to be increased with the increasing absolute value of the target yaw rate Ytar. A map (a reference curve current map) (not illustrated) may be used for the setting.

In Step S2, the ECU 36 (the first correction coefficient calculator 162) sets the first correction coefficient α on the basis of the reference curve radius Rref and the steering angle control value θc. The first correction coefficient α is a positive coefficient to reflect the effect of the reference curve radius Rref and the steering angle control value θc in the target yaw rate Ytar. For example, the first correction coefficient α is increased with the decreasing reference curve radius Rref (as the curve becomes sharper). In addition, the first correction coefficient α is increased with the increasing steering angle control value θc. The setting of the first correction coefficient α may be performed using a map (a first correction coefficient map) (not illustrated).

The reference curve radius Rref indicates the radius R of a curve to be subjected to driving support. Although the reference curve radius Rref is the radius R1 of the first curve 302 in principle when the vehicle 10 is running on the first curve 302, the radius R2 of the second curve 304 may be exceptionally used as the reference curve radius Rref in the present embodiment. How to calculate the reference radius Rref will be described below.

The steering angle control value θc is the steering angle used by the ECU 36 to set the target curve current Icvtar. The steering angle control value θc is basically equal to the detection value (the steering angle detection value θs) of the steering angle sensor 52. However, in the present embodiment, the steering angle control value θc may be corrected to make the steering angle control value θc different from the steering angle detection value θs in order for the vehicle 10 to preferably drive on the S-shaped curve 300. How to calculate the steering angle control value θc will be described below with reference to FIG. 4.

In Step S3, the ECU 36 (the multiplier 164) multiplies the reference curve current Icvref by the first correction coefficient α to calculate correction reference current Icvref2.

In Step S4, the ECU 36 performs a rate limiting process to the correction reference current Icvref2 to calculate the target curve current Icvtar. The rate limiting process is a process of suppressing the amount of variation of the correction reference current Icvref2 per unit time. Accordingly, the variation in the target curve current Icvtar can be made gentle through the rate limiting process.

[A2-3. Setting of Reference Curve Radius Rref]

As described above, the reference curve radius Rref (hereinafter also referred to as the "reference radius Rref") indicates the radius R of a curve to be subjected to the driving support. When the vehicle 10 is running on the first curve 302, the reference radius Rref is basically the radius R1 of the first curve 302. However, in the present embodiment, in movement of the vehicle 10 from the first curve 302 to the second curve 304, the driving support (cornering support) on the second curve 304 is started at appropriate and earlier timing. In association with this, control based on the radius R2 of the second curve 304 may be performed even if the vehicle 10 does not reach the exit of the first curve 302. The reference curve radius Rref is the curve radius R that is set in consideration of the above condition and has the value of the radius R1 or the radius R2. The reference radius Rref may include the direction (left or right), in addition to the length [m].

For example, if it is determined in Step S17 in FIG. 4 described below that the running on the second curve 304 is to be started, the ECU 36 performs the driving support (cornering support) for the second curve 304 using the radius R2 of the second curve 304 even if the vehicle 10 is running on the first curve 302.

[A2-4. Calculation of Steering Angle Control Value θc]

Figure 4:
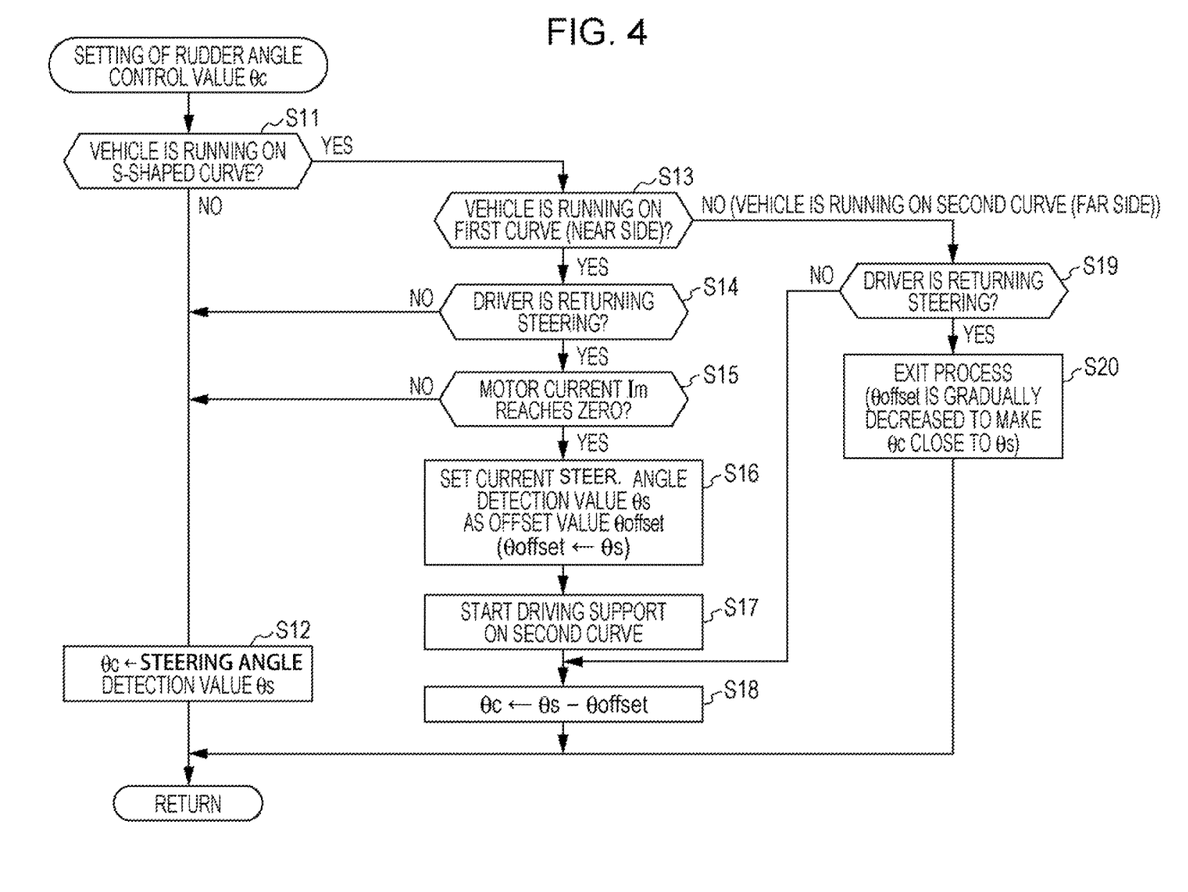
FIG. 4 is a flowchart illustrating an exemplary process of calculating a steering angle control value by the EPS ECU in the above embodiment.

FIG. 4 is a flowchart illustrating an exemplary process of calculating the steering angle control value θc by the EPS ECU 36 in the present embodiment. The calculation of the steering angle control value θc is performed by the steering angle control value calculator 172 in the ECU 36 (FIG. 2). The EPS ECU 36 repeats the process in FIG. 4 on a certain second calculation cycle (for example, a cycle of several microseconds to several hundred milliseconds).

Referring to FIG. 4, in Step S11, the ECU 36 determines whether the vehicle 10 is running on the S-shaped curve 300. The determination here may be based on whether a difference ΔL between the distance L1out to the exit of the first curve 302 and the distance L2in to the entrance of the second curve 304 is smaller than or equal to a predetermined distance threshold value THΔL.

If the vehicle 10 is not running on the S-shaped curve 300 (NO in Step S11), in Step S12, the ECU 36 directly uses the steering angle detection value θs supplied from the steering angle sensor 52 as the steering angle control value θc. If the vehicle 10 is running on the S-shaped curve 300 (YES in Step S11), the process goes to Step S13.

In Step S13, the ECU 36 determines whether the vehicle 10 is running on the first curve 302 (at the near side). If the vehicle 10 is running on the first curve 302 (YES in Step S13), in Step S14, the ECU 36 determines whether the driver is returning the steering wheel 20.

If the driver is not returning the steering wheel 20 (NO in Step S14), the process goes to Step S12. If the driver is returning the steering wheel 20 (YES in Step S14), in Step S15, the ECU 36 determines whether the motor current Im reaches zero. If the motor current Im does not reach zero (NO in Step S15), the process goes to Step S12. If the motor current Im reaches zero (YES in Step S15), the process goes to Step S16.

In Step S16, the ECU 36 sets the current steering angle detection value θs as an offset value θoffset. The offset value θoffset is used to correct the steering angle detection value θs when the vehicle 10 is running on the second curve 304.

In Step S17, the ECU 36 starts the driving support on the second curve 304. In other words, the curve to be subjected to the driving support is switched from the first curve 302 on which the vehicle 10 is currently running to the next curve (the second curve 304). In Step S18, the ECU 36 uses a value resulting from subtraction of the offset value θoffset from the steering angle detection value θs as the steering angle control value θc.

If the vehicle 10 is not running on the first curve 302 (at the near side) (NO in Step S13), the vehicle 10 is running on the second curve 304 (at the far side). In this case, in Step S19, the ECU 36 determines whether the driver is returning the steering wheel 20 while the vehicle 10 is running on the second curve 304.

If the driver is not returning the steering wheel 20 (NO in Step S19), in Step S18, the ECU 36 uses a value resulting from subtraction of the offset value θoffset from the steering angle detection value θs as the steering angle control value θc. If the driver is returning the steering wheel 20 (YES in Step S19), in Step S20, the ECU 36 performs an exit process.

As described above, the steering angle detection value θs is different from the steering angle control value θc while the vehicle 10 is running on the second curve 304 (refer to Step S18 in FIG. 4. When the vehicle 10 exits the second curve 304 with the steering angle detection value θs being different from the steering angle control value θc, it is necessary to set the steering wheel 20 in a state in which the steering wheel 20 is rotated from a rotation reference position (corresponding to the steering angle detection value θs) in order to cause the vehicle 10 to go straight ahead. When the vehicle 10 goes straight ahead in the state in which the steering wheel 20 is rotated from the rotation reference position, a feeling of strangeness may possibly be provided to the driver. Accordingly, (shifted) in the present embodiment, the exit process is performed to make the steering angle control value θc equal to the steering angle detection value θs when the vehicle 10 exits the second curve 304.

As also described below with reference to FIG. 5, in the exit process, the offset value θoffset is gradually decreased as the vehicle 10 comes close to the exit of the second curve 304 to make the steering angle control value θc close to the steering angle detection value θs. Specifically, the amount of change of the steering angle control value θc is made larger than the amount of change of the steering angle detection value θs and, when the vehicle 10 reaches the exit of the second curve 304, the offset value θoffset is decreased to zero.

When three or more curves are sequentially provided, Steps S14 to S18 may be performed also for the second curve 304 without the exit process (Step S20). In other words, the second curve 304 may be considered as the new first curve 302 and the curve next to the second curve 304 may be considered as the second curve 304.

[A2-5. Calculation of Reference Yaw Rate Yref]

The reference yaw rate calculator 174 divides the vehicle speed Vs by the reference radius Rref to calculate the reference yaw rate Yref (Yref←Vs/Rref).

[A2-6. Calculation of Second Correction Coefficient β]

The second correction coefficient calculator 176 calculates the second correction coefficient β on the basis of the reference radius Rref, the distance-to-end-point L1out of the first curve 302, and the distance-to-starting-point L2in of the second curve 304. The second correction coefficient β is a positive coefficient to weight the reference yaw rate Yref on the basis of the reference radius Rref, the distance-to-end-point L1out, an the distance-to-starting-point L2in.

When the vehicle 10 is running on the first curve 302, the second correction coefficient β is set to a lower value as the reference radius Rref is decreased, the distance-to-end-point L1out is shortened, and the distance-to-starting-point L2in is shortened.

[A2-7. Calculation of Target Yaw Rate Ytar]

The target yaw rate calculator 178 multiplies the reference yaw rate Yref by the second correction coefficient β to calculate the target yaw rate Ytar (Ytar←Yref×β).

[A2-8. Comparison between Present Embodiment and Comparative Example]

Figure 5:
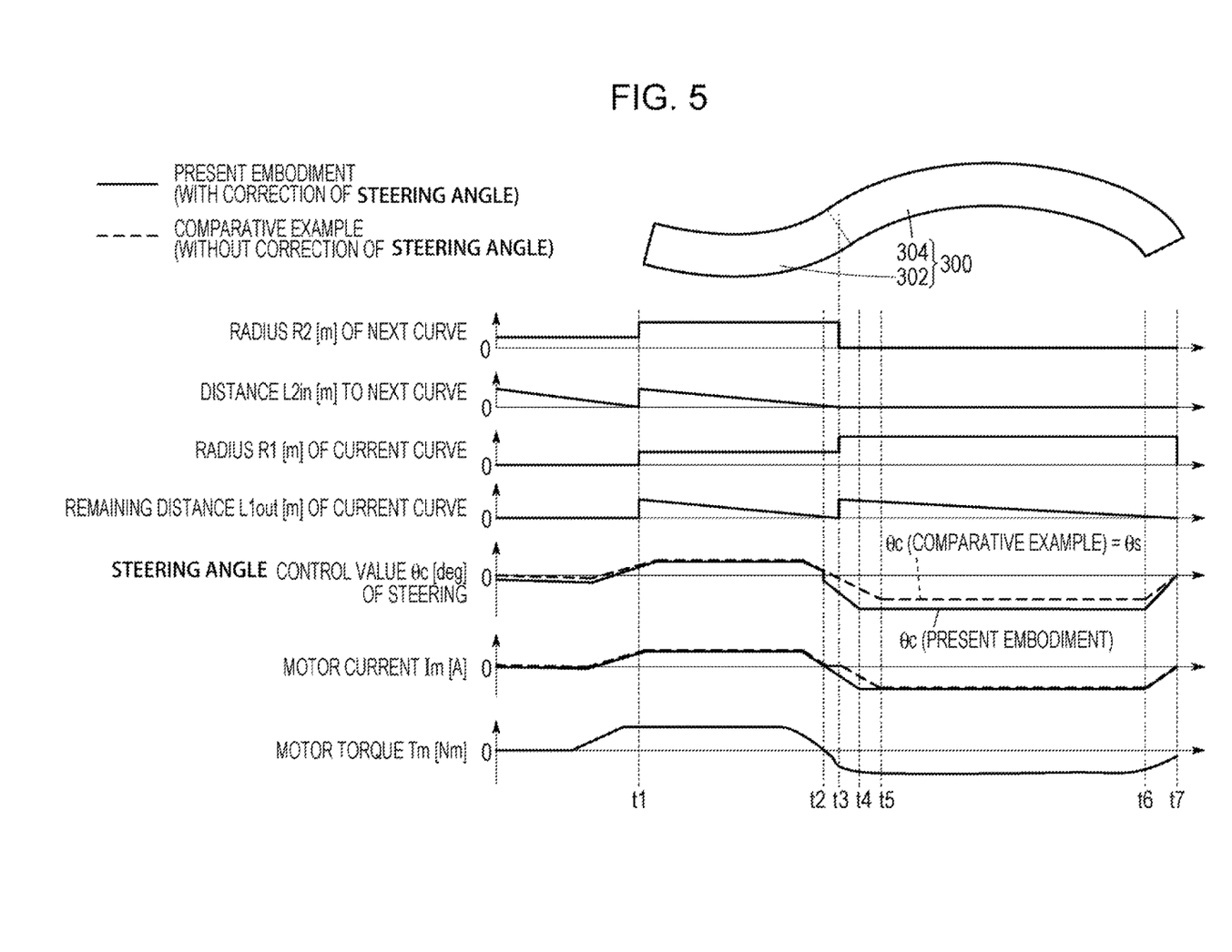
FIG. 5 illustrates the relationship between an S-shaped curve and various numerical values when steering assist control of a comparative example and steering assist control of the above embodiment are used.

FIG. 5 illustrates the relationship between the S-shaped curve 300 and various numerical values when the steering assist control of a comparative example and the steering assist control of the present embodiment are used. Referring to FIG. 5, broken lines correspond to the comparative example and solid lines correspond to the present embodiment. Portions where no broken line exists and only the solid line exists correspond to both the comparative example and the present embodiment. In the steering assist control in the comparative example, the steering angle detection value θs is directly used as the steering angle control value θc. Accordingly, the offset value θoffset is not used in the comparative example.

The first curve 302 at the near side starts at a time t1 in FIG. 5 and continues until a time t3. Although the motor current Im reaches zero at a time t2 when the vehicle 10 is running on the first curve 302, the steering angle detection value θs does not reach the zero at the time t2. Accordingly, in the comparative example, the motor current Im is kept at zero from the time t2 to the time t3. In association with this, it is necessary to cause the steering wheel 20 to rotate until a time t5.

In contrast, in the present embodiment, when the motor current Im reaches zero at the time t2 (YES in Step S15 in FIG. 4), the use of the offset value θoffset causes the steering angle detection value θs to be forcedly reset to zero (Step S18). Accordingly, in the present embodiment, the motor current Im for the cornering on the second curve 304 is output from the time t2 to the time t3. Consequently, it is sufficient for the steering wheel 20 to rotate until a time 4.

In addition, in the present embodiment, during a time period from a time t6 to a time t7, when the driver returns the steering wheel 20, the amount of change of the steering angle control value θc is made greater than the amount of change of the steering angle detection value θs (the exit process (Step S20 in FIG. 4)).

A3. Advantages of Present Embodiment

As described above, according to the present embodiment, the steering angle control value θc is shifted with respect to the steering angle detection value θs in response to the return of the steering wheel 20 (YES in Step S14 in FIG. 4) while the vehicle 10 is running on the first curve 302 (YES in Step S13) and the decrease of the cornering assist torque Tcv (part of the steering assist torque Tasi) to zero (torque threshold value) (YES in Step S15), and the generation of the cornering assist torque Tcv for the second curve 304 is started before the steering angle detection value θs returns to zero (sensor median) (FIG. 5). Accordingly, the cornering assist torque Tcv for the second curve 304 is capable of being generated even before the steering angle detection value θs returns to zero. Consequently, it is possible to prevent the feeling of strangeness for the cornering assist torque Tcv from being provided to the driver at. the start of the cornering on the second curve 304.

In the present embodiment, the ECU 36 (control unit) offsets the steering angle control value θc (Step S18 in FIG. 4) to shift the steering angle control value θc with respect, to the steering angle detection value θs. Accordingly, it is possible to shift the steering angle control value θc with respect to the steering angle detection value θs using the simple process.

In the present embodiment, the ECU 36 (control unit) sets or stores, as the offset value θoffset, the steering angle detection value θs when the driver returns the steering wheel 20 (YES in Step S14 in FIG. 4) while the vehicle 10 is running on the first curve 302 (YES in Step S13) and the cornering assist torque Tcv (part of the steering assist torque Tasi) decreases to zero (torque threshold value) (Step S16). Then, the ECU 36 subtracts the offset value θoffset from the steering angle detection value θs to set the result of the subtraction as the steering angle control value θc (Step S18). Accordingly, it is possible to set the steering angle control value θc to zero (control median) using the simple method.

In the present embodiment, the ECU 36 (control unit) calculates the reference yaw rate Yref on the basis of the radius R (the reference radius Rref) of the curve on which the vehicle 10 is currently running and the vehicle speed Vs (FIG. 2). In addition, the ECU 36 sets the second correction coefficient β on the basis of the radius R (the reference radius Rref) of the curve on which the vehicle 10 is currently running (FIG. 2). Furthermore, the ECU 36 sets the target curve current Icvtar (corresponding to the cornering assist torque Tcv or the steering assist torque Tasi) in accordance with the target yaw rate Ytar, which is the product of the reference yaw rate Yref and the second correction coefficient β (FIG. 2 and FIG. 3). Accordingly, while the vehicle 10 is cornering, it is possible to set the steering assist torque Tasi with the effect of the reference radius Rref being reflected in the reference yaw rate Yref.

In the present embodiment, the EPS ECU 36 (control unit) decreases the first correction coefficient α stepwise in accordance with the distance L2in from the current position Pc of the vehicle 10 to the entrance of the second curve 304 while the vehicle 10 is running on the first curve 302 (FIG. 2). As a result, the cornering assist torque Tcv for the cornering on the first curve 302 is decreased stepwise. Accordingly, when the vehicle 10 enters the second curve 304, it is possible to decrease the cornering assist torque Tcv for the cornering on the first curve 302 to a first predetermined value (for example, zero). Consequently, when the vehicle 10 starts the cornering on the second curve 304, it is possible to smoothly generate the cornering assist torque Tcv for the cornering on the second curve 304.

In the present embodiment, the ECU 36 (control unit) decreases the first correction coefficient α stepwise in accordance with the distance L1out from the current position Pc of the vehicle 10 to the exit of the first curve 302 while the vehicle 10 is running on the first curve 302 (FIG. 2). As a result, the cornering assist torque Tcv for the cornering on the first curve 302 is decreased stepwise. Accordingly, when the vehicle 10 exits the first curve 302, it is possible to decrease the cornering assist torque Tcv for the cornering on the first curve 302 to a second predetermined value (for example, zero). Consequently, when the vehicle 10 starts the cornering on the second curve 304, it is possible to smoothly generate the cornering assist torque Tcv for the cornering on the second curve 304.

In the present embodiment, when the steering wheel 20 is returned (YES in Step S19 in FIG. 4) while the vehicle 10 is running on the second curve 304 (NO in Step S13), the ECU 36 (control unit) increases the amount of decrease of the steering angle control value θc with respect to the amount of decrease of the steering angle detection value θs to make the steering angle control value θc equal to the steering angle detection value θs before the vehicle 10 reaches the exit of the second curve 304 (Step S20). Accordingly, at the end of the second curve 304, the reference position of the steering wheel 20 coincides with the control median. Consequently, it is possible to avoid the feeling of strangeness of the driver caused by the difference between the reference position of the steering wheel 20 and the control median (the vehicle 10 that goes straight in a state in which the steering wheel 20 is rotated from the reference position).

In the present embodiment, the ECU 36 (control unit) acquires the map information Imap (the radius R1 and distance-to-end-point L1out) about the first curve 302 from the map DB 18 (map information storage unit) (FIG. 2). In addition, while the vehicle 10 is running on the first curve 302, the ECU 36 calculates the target curve current Icvtar (and the target yaw rate Ytar, the first correction coefficient α, and the second correction coefficient β) using the map information Imap about the first curve 302 (FIG. 3). In other words, the ECU 36 calculates the steering assist torque Tasi assisting the cornering on the first curve 302 on the basis of the map information Imap about the first curve 302 and uses the steering assist torque Tasi when the vehicle 10 is cornering on the first curve 302. Accordingly, it is possible to perform the driving support on the first curve 302 with high precision and to generate the steering assist torque Tasi for the second curve 304 with higher precision.

In the present embodiment, the ECU 36 (control unit) acquires the map information Imap (the radius R2, the distance-to-starting-point L2in, and the distance-to-end-point L2out) about the second curve 304 from the map DB 18 (map information storage unit) (FIG. 2). In addition, the ECU 36 calculates the target curve current Icvtar (and the target yaw rate Ytar, the first correction coefficient α, and the second correction coefficient β) using the map information Imap about the second curve 304 (FIG. 3). In other words, the ECU 36 calculates the steering assist torque Tasi assisting the cornering on the second curve 304 on the basis of the map information Imap about the second curve 304. The ECU 36 starts the generation of the steering assist torque Tasi for the second curve 304 before the steering angle detection value θs returns to the sensor median (FIG. 4 and FIG. 5). Accordingly, it is possible to perform the driving support on the second curve 304 with high precision and to generate the steering assist torque Tasi for the second curve 304 with higher precision.

B. Modifications

The present disclosure is not limited to the above embodiment and various configuration may be adopted on the basis of the content described in this specification. For example, the following configurations may be adopted.

B1. Target to be Mounted

The EPS apparatus 16 (steering apparatus) is mounted in the vehicle 10 in the above embodiment (FIG. 1). However, the target to be mounted is not limited to the vehicle 10, for example, from the viewpoint of the support of the steering of the steering wheel 20. For example, the present disclosure may be applied to a movable body or a movable apparatus provided with the steering wheel 20 (or an operator).

B2. GPS Antenna 12 and Map Information Providing Device 14

The mounting of the GPS antenna 12 and the map information providing device 14 in the vehicle 10 is described in the above embodiment (FIG. 1). However, part or all of the GPS antenna 12 and the map information providing device 14 may be provided in a mobile terminal and the mobile terminal may be connected to the network of the vehicle 10.

B3. EPS Apparatus 16

[B3-1. Entire Configuration of EPS Apparatus 16]

The EPS apparatus 16 of the above embodiment has the configuration in which the EPS motor 28 transmits the motor torque Tm to the steering shaft 42 (the EPS apparatus 16 is a so-called column assist EPS apparatus). However, the configuration of the EPS apparatus 16 is not limited to the above one as long as the motor torque Tm is generated. For example, the EPS apparatus 16 may be any of a pinon assist EPS apparatus, a dual pinion assist EPS apparatus, a rack assist EPS apparatus, and an electric hydraulic power steering apparatus. In the case of the electric hydraulic power steering apparatus, oil pressure is generated with an electric pump and the motor torque Tm is generated using the oil pressure.

Although the configuration in which the steering torque caused by the driver is directly transmitted to the front wheels 86 (hereinafter also referred to as a "direct transmission method") is adopted in the above embodiment, the present disclosure is applicable to a steer-by-wire electric power steering apparatus.

[B3-2. EPS Motor 28]

Although the EPS motor 28 is of the three-phase AC brushless type in the above embodiment, the EPS motor 28 is not limited to this type. For example, the motor 28 may be of the three-phase AC brush type, the single-phase AC type, or the DC type.

Power is supplied to the EPS motor 28 from the low-voltage battery 38 in the above embodiment (FIG. 1). Power may be supplied to the EPS motor 28 from an alternator, a fuel cell, or a high-voltage battery, in addition to the supply of the power from the low-voltage battery 38 or instead thereof.

[B3-3. EPS ECU 36]

The mounting of the ECU 36 in the vehicle 10 is described in the above embodiment (FIG. 1). However, part of the ECU 36 may be provided in a mobile terminal and the mobile terminal may be connected to the network of the vehicle 10 to configure the ECU 36.

B4. Steering Assist Control

[B4-1. Cornering Assist Torque Tcv (Steering Assist Torque)]

Driving force (torque) of the same direction as that of the steering torque Tstr of the driver is generated as the steering assist torque Tasi in the steering assist control in the above embodiment. However, the steering assist torque Tasi is not limited to the above one, for example, from the viewpoint of the assistance of the steering using the steering wheel 20. Force exerted in a direction opposite to that of the steering torque Tstr (for example, reaction force) may be generated as the steering assist torque Tasi.

The "assistance of the steering using the steering wheel 20" includes both making the steering wheel 20 easier to turn in a direction desired by the driver (for example, the configuration in the above embodiment) and making the steering wheel 20 harder to turn in a direction desired by the driver in the configuration in which the EPS apparatus 16 directly transmits the steering torque Tstr to the steering wheels (the front wheels 86) (the direct transmission method).

[B4-2. Steering Angle Control Value θc]

The steering angle control value θc is shifted with respect to the steering angle detection value θs (Step S18 in FIG. 4) in response to the motor current Im that reaches zero (YES in Step S15) in the above embodiment. However, the shift of the steering angle control value θc with respect to the steering angle detection value θs is not limited to the above one, for example, from the viewpoint of the start of the cornering support on the second curve 304 at appropriate timing. For example, the steering angle control value θc may be shifted with respect to the steering angle detection value θs in response to the motor current Im that reaches a value close to zero. Alternatively, the motor current Im may not be a detection value with the current sensor 34 but may be a target value (that is, the target motor current Imtar) set by the ECU 36.

The steering angle control value θc is shifted with respect to the steering angle detection value θs using the offset value θoffset in the above embodiment (Step S18 in FIG. 4). However, the offset value θoffset is not limitedly used, for example, from the viewpoint of the shift of the steering angle control value θc with respect to the steering angle detection value θs. For example, the amount of change of the steering angle control value θc with respect to the amount of change of the steering angle detection value θs may be increased in response to the motor current Im that reaches zero (YES in Step S15). Alternatively, the steering angle control value θc may be reset in response to the motor current Im that reaches zero (YES in Step S15).

The steering angle detection value θs when the motor current Im reaches zero is directly used as the offset value θoffset in the above embodiment (Step S16 in FIG. 4). However, the above method is not limitedly used, for example, from the viewpoint of the offset of the steering angle detection value θs. The steering angle control value θc may be offset using a value resulting from multiplication or division of the steering angle detection value θs by a certain coefficient or a value resulting from addition of a fixed value to the steering angle detection value θs or subtraction of a fixed value from the steering angle detection value θs.

[B4-3. First Correction Coefficient α]

The first correction coefficient α is calculated on the basis of the reference curve radius Rref and the steering angle control value θc in the above embodiment (Step S2 in FIG. 3). However, the calculation of the first correction coefficient α is not limited to the above one, for example, from the viewpoint of the shift of the steering angle control value θc with respect to the steering angle detection value θs (Step S18 in FIG. 4). For example, the first correction coefficient α may be calculated on the basis of one of the reference curve radius Rref and the steering angle control value θc. Alternatively, a configuration in which the first correction coefficient α is not used may be adopted.

[B4-4. Second Correction Coefficient β]

The second correction coefficient β is calculated on the basis of the reference radius Rref, the distance-to-end-point L1out of the first curve 302, and the distance-to-starting-point L2in of the second curve 304 in the above embodiment (refer to FIG. 2). However, the calculation of the second correction coefficient β is not limited to the above one, for example, from the viewpoint of the shift of the steering angle control value θc with respect to the steering angle detection value θs (Step S18 in FIG. 4). For example, the second correction coefficient β may be calculated on the basis of one or two of the reference radius Rref, the distance-to-end-point L1out, and the distance-to-starting-point L2in. Alternatively, a configuration in which the second correction coefficient β is not used may be adopted.

[B4-5. Others]

The curve radius R (R1, R2) is used in the steering assist control in the above embodiment. However, for example, a curvature radius of the curve may be used from the viewpoint of the reflection of the degree of curvature of the curve.

The steering angle control value θc is used to calculate the first correction coefficient α by which by the reference curve current Icvref is multiplied in the above embodiment (Step S2 in FIG. 3). However, the above method is not limitedly used, for example, from the viewpoint of the cornering support on the second curve 304 at appropriate timing. For example, correction current corresponding to the steering angle control value θc may be calculated and the calculated correction current may be supplied to the adder 156.

The exit process is performed when the vehicle 10 exits the second curve 304 in the above embodiment (Step S20 in FIG. 4). However, the exit process may be omitted, for example, from the viewpoint of the shift of the steering angle control value θc with respect to the steering angle detection value θs for the cornering support on the second curve 304.

The ECU 36 performs the control using the reference yaw rate Yref and the target yaw rate Ytar in the above embodiment (FIG. 2 and FIG. 3). However, the above method is not limitedly used, for example, from the viewpoint of the cornering support of the vehicle 10. For example, the ECU 36 may use a reference value of a lateral acceleration (a reference lateral acceleration) or a target value of the lateral acceleration (a target lateral acceleration) of the vehicle 10, in addition to the reference yaw rate Yref and the target yaw rate Ytar or instead thereof. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A steering apparatus comprising:
a steering angle sensor that acquires a detected value of a steering angle of a steering wheel as a steering angle detection value;
a motor that generates steering assist torque assisting steering; and
a controller that controls an output from the motor using a steering angle control value calculated on the basis of the steering angle detection value,
wherein, when a vehicle travels through a first curve and a second curve which are different in cornering direction and which are sequentially provided, the controller determines whether the steering wheel is returning and the steering assist torque is decreased to a torque threshold value while the vehicle is running in the first curve and before the steering angle detection value returns to a sensor neutral point of the steering angle sensor due to returning of the steering wheel, and if so, shifts the steering angle control value with respect to the steering angle detection value to start the generation of the steering assist torque for the second curve before the steering angle detection value returns to the sensor neutral point of the steering angle sensor due to returning of the steering wheel,
wherein the steering angle detection value is the detected value of the steering angle detected by the steering angle sensor, and the steering angle control value is a calculated value of the steering angle calculated by using the steering angle detection value.

2. The steering apparatus according to claim 1, wherein the controller shifts the steering angle control value with respect to the steering angle detection value by offsetting or resetting the steering angle control value.

3. The steering apparatus according to claim 2, wherein the controller stores the steering angle detection value at the time when the steering wheel is returning and the steering assist torque is decreased to the torque threshold value while the vehicle is running in the first curve as an offset value,
and subtracts the offset value from the steering angle detection value to use the result of the subtraction as the steering angle control value.

4. The steering apparatus according to claim 1, wherein the controller calculates a reference yaw rate of the vehicle on the basis of a radius or a curvature radius of a curve on which the vehicle is currently running and a vehicle speed, sets a correction coefficient on the basis of the radius or the curvature radius of the curve on which the vehicle is currently running, and sets the steering assist torque in accordance with a target yaw rate, the target yaw rate being a product of the reference yaw rate and the correction coefficient.

5. The steering apparatus according to claim 1, wherein, while the vehicle is running in the first curve, the controller decreases the steering assist torque for cornering on the first curve stepwise in accordance with a distance from a current position of the vehicle to an entrance of the second curve.

6. The steering apparatus according to claim 1, wherein, while the vehicle is running in the first curve, the controller decreases the steering assist torque for cornering on the first curve stepwise in accordance with a distance from a current position of the vehicle to an exit of the first curve.

7. The steering apparatus according to claim 1, wherein the controller more decreases the steering angle control value than the steering angle detection value when the steering wheel is returning while the vehicle is running in the second curve such that the steering angle control value becomes equal to the steering angle detection value before the vehicle reaches an exit of the second curve.

8. The steering apparatus according to claim 1, wherein the controller acquires map information about the first curve from a map information storage device and calculates the steering assist torque assisting cornering on the first curve on the basis of the map information about the first curve to use the calculated steering assist torque when the vehicle corners on the first curve.

9. The steering apparatus according to claim 8, wherein the controller acquires map information about the second curve from the map information storage device, calculates the steering assist torque assisting cornering on the second curve on the basis of the map information about the second curve, and starts the generation of the steering assist torque for the second curve before the steering angle detection value returns to the sensor median.

10. A steering assist method using a steering apparatus including a steering angle sensor that acquires a detected value of a steering angle of a steering wheel as a steering angle detection value; a motor that generates steering assist torque assisting steering;
and a controller that controls an output from the motor using a steering angle control value calculated on the basis of the steering angle detection value, the method comprising:
determining, by using the controller, whether a vehicle travels through a first curve and a second curve which are different in cornering direction and which are sequentially provided;
determining, by using the controller, whether the steering wheel is returning and the steering assist torque is decreased to a torque threshold value while the vehicle is running in the first curve and before the steering angle detection value returns to a sensor neutral point of the steering angle sensor due to returning of the steering wheel, and if so, shifting the steering angle control value with respect to the steering angle detection value to start the generation of the steering assist torque for the second curve before the steering angle detection value returns to the sensor neutral point of the steering angle sensor due to returning of the steering wheel,
wherein the steering angle detection value is the detected value of the steering angle detected by the steering angle sensor, and the steering angle control value is a calculated value of the steering angle calculated by using the steering angle detection value.

11. The steering apparatus according to claim 3, wherein the controller more decreases the steering angle control value than the steering angle detection value when the steering wheel is returning while the vehicle is running in the second curve such that the effect by the subtraction of the offset value from the steering angle control value becomes zero before the vehicle reaches an exit of the second curve.

12. The steering apparatus according to claim 4, wherein the correction coefficient is adjusted by the steering angle control value.

13. The steering apparatus according to claim 12, wherein the steering angle control value is increased as the steering angle detection value is increased.

14. The steering apparatus according to claim 1, wherein, before the shifting, the steering angle control value is equal to the steering angle detection value.

15. A vehicle comprising the steering apparatus according to claim 1.

16. A mobile terminal comprising:
an interface circuit connected to a steering angle sensor that acquires a detected value of a steering angle of a steering wheel as a steering angle detection value, and connected to a motor that generates steering assist torque assisting steering; and
a controller that controls an output from the motor using a steering angle control value calculated on the basis of the steering angle detection value,
wherein, when a vehicle travels through a first curve and a second curve which are different in cornering direction and which are sequentially provided, the controller determines whether the steering wheel is returning and the steering assist torque is decreased to a torque threshold value while the vehicle is running in the first curve and before the steering angle detection value returns to a sensor neutral point of the steering angle sensor due to returning of the steering wheel, and if so, shifts the steering angle control value with respect to the steering angle detection value to start the generation of the steering assist torque for the second curve before the steering angle detection value returns to the sensor neutral point of the steering angle sensor due to returning of the steering wheel,
wherein the steering angle detection value is the detected value of the steering angle detected by the steering angle sensor, and the steering angle control value is a calculated value of the steering angle calculated by using the steering angle detection value.

* * * * *